Patented July 11, 1944

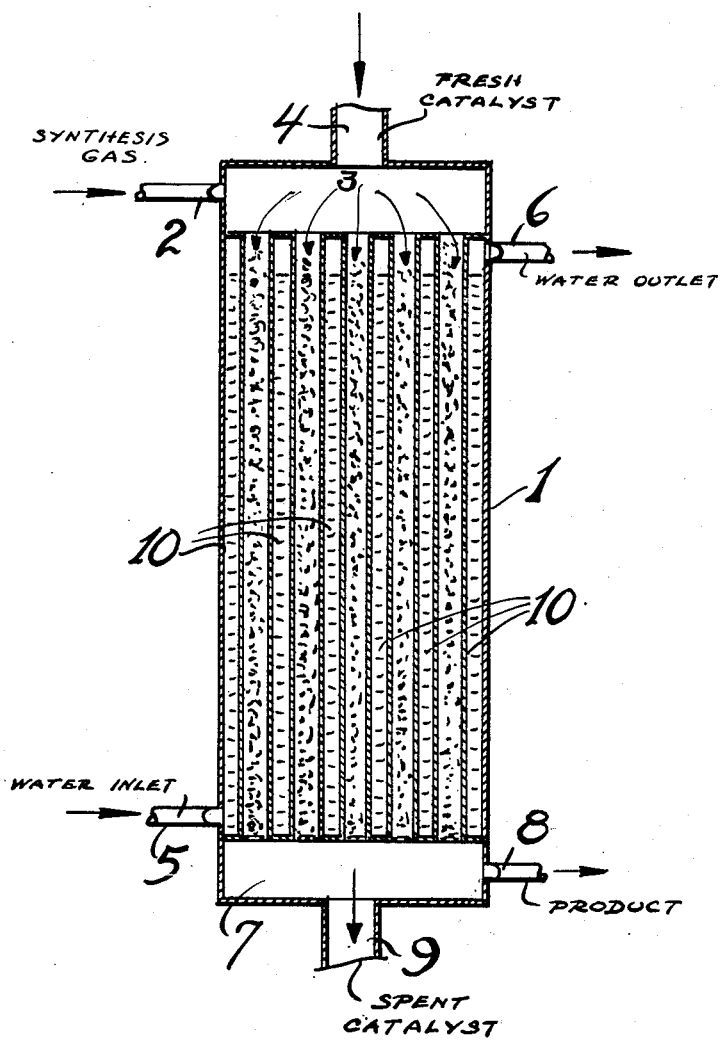

2,353,600

UNITED STATES PATENT OFFICE 2,353,600

PROCESS FOR CONTROLLING TEMPERATURE IN EXOTHERMIC CHEMICAL REACTIONS

Sumner B. Sweetser, Baton Rouge, La., assignor, by mesne assignments, to Standard Catalytic Company, a corporation of Delaware Application August 22, 1940, Serial No. 353,631

2 Claims. (Cl. 260—449.6)

The present invention is concerned with an improved refining process especially adapted for the production of hydrocarbon constituents by the hydrogenation of oxides of carbon. The invention is more particularly concerned with an improved method for regulating the rate of reaction and for maintaining an optimum temperature within the catalytic reaction zone which will be dependent upon and be a function of the catalytic activity of the catalyst employed. In accordance with the present process the reaction is carried out in relatively long, liquid cooled reactors packed with a suitable catalyst. The fresh catalyst is introduced at the top of the reaction or synthesizing zones, while the spent catalyst is withdrawn continuously or at suitable intervals from the bottom of the reaction zones. The temperature of operation within the reaction zones is raised an amount corresponding to the extent to which the catalyst is spent. This temperature rise is secured by the liquid head of the cooling medium since the boiling point of the cooling medium rises as the hydrostatic head increases. The hydrostatic head of the cooling liquid produces a gradual increase in the boiling point of the liquid towards the bottom of the reaction zone so that the spent or partially spent catalyst as it passes downwardly in the reaction zone contacts the feed gases at a gradually increasing higher temperature than the fresh catalyst introduced at the top of the reaction zone.

It is known in the art to react hydrogen with oxides of carbon in the presence of a suitable catalyst under conditions to produce hydrocarbon constituents containing more than one carbon atom in the molecule, as well as various oxygenated compounds. The catalysts are selected from the the class of materials which are known as suitable catalysts for aiding the hydrogenation of oxides of carbons. Satisfactory catalysts are, for example, cerium, chromium, cobalt, manganese, osmium, palladium, titanium, zinc, iron and oxides or other compounds of these metals. Mixtures of these catalysts are also employed, and the same are in certain instances impregnated with suitable agents adapted to increase their efficiency or strength. These catalysts, depending upon the general character of the operation, are employed in the pilled, granulated, or powdered form.

Operating temperatures and pressures vary widely and depend upon the feed materials employed, the particular catalyst or catalytic mixture, and upon the quality of the products and yields desired. The temperatures in general are in the range from about 360° F. to 410° F. However, in reactions of this character, it is essential for the success of the operation that the exothermic heat of reaction be immediately removed and that the temperature of the reaction be positively controlled at the predetermined operating temperature. It is also desirable that the predetermined operating temperature be adjusted in such a manner that it is a function of the extent to which the particular catalyst is spent. Thus it is desirable to regulate the temperature in such a manner that as the efficiency of the catalyst gradually decreases, the reaction temperature will be gradually increased. Thus the reaction is extremely difficult to satisfactorily control, since it is essential that the temperature of the reaction in processes of this character does not vary over a temperature range in excess of about 10° F. and preferably should not vary over a temperature range in excess of 5° F. from a predetermined operating temperature. If a variation substantially in excess of this occurs, the control of the operation is lost, a run-away reaction occurs, and the yields of the desired products are materially decreased. Furthermore, if the reaction temperature is not adjusted with respect to the lessened activity of the catalyst, the catalyst to a large extent becomes relatively inactive and yields are materially affected. Thus various means have been proposed to remove the heat of reaction and to control the operating temperatures, which means usually comprise various liquid cooling mediums which are circulated without or within the reaction zone or zones. Attempts to regulate operating temperatures with respect to the activity of the catalyst usually comprise passing the catalyst from one zone to another in which higher operating temperatures are employed.

It has heretofore been the practice to employ reaction zones having a relatively small diameter, the lengths of which are relatively short, particularly when external cooling liquid mediums are employed. If relatively long reaction zones were employed, the difference in the hydrostatic head of a boiling cooling medium resulted in excessive and prohibitive temperature differentials between the upper and lower sections of the reactors.

I have now discovered a process by which it is possible to efficiently and economically secure and regulate the desired reaction temperature within particular areas of the reaction zone. My process involves utilizing reaction zones which are substantially extended over and above reaction zones now currently employed, and passing the feed gases downwardly through these zones. The reaction zones are packed with a suitable catalyst which is continuously or at suitable intervals introduced into the top and withdrawn from the bottom of the same. The heat of reaction is removed by circulating and boiling a suitable liquid cooling medium around the zones. When operating in this manner a relatively long vertical head of cooling liquid is maintained without the reaction zone, the boiling temperature of which gradually increases corresponding to the gradually increasing hydrostatic liquid head. This gradual increase in temperature of the cooling liquid in the direction of flow of feed gases and catalyst is directly reflected in a gradual increase in temperature within the reaction zone. Thus, as the activity of the catalyst is lessened as it passes downwardly through the reaction zone, the temperature within the zone is gradually increased. By this means the entire hydrogenation operation can be operated at maximum efficiency, even though there is a considerable difference in catalytic activity and temperature between the bottom and top of the catalyst zone.

The process of my invention may be readily understood by reference to the attached drawing illustrating modifications of the same. For purposes of description it is assumed that the synthesis gases comprise oxides of carbon and hydrogen which are introduced into synthesis chamber 1 by means of feed line 2. Temperature and pressure conditions are in general adjusted to produce hydrocarbon constituents containing more than one carbon atom in the molecule. These gases pass downwardly in reaction chamber 1 through catalyst packed tubular reaction zones 3, packed with a suitable catalyst which is introduced in the catalyst zone 1 by means of line 4. The reaction gases pass downwardly through reaction zones 3 under suitable temperature and pressure conditions adapted to produce hydrocarbon constituents containing more than one carbon atom in the molecule. These gases are collected in zone 7 and withdrawn from the synthesis chamber by means of line 8. These gases may be handled in any desirable manner in order to separate the reaction products from unreacted gases and by-products. The fresh catalyst is introduced continuously or at suitable intervals into the top of synthesis chamber 1 by means of line 4 and is withdrawn from the bottom of the chamber by means of line 9. Thus as the catalyst passes downwardly through the respective reaction zones 3 its activity is lessened and it is less efficient in promoting the desired reaction at the temperature which is optimum for promoting the reaction when utilizing fresh catalyst which is introduced by means of line 4. It is therefore desirable to correspondingly raise the temperature corresponding to the degree to which the catalyst is spent in order to secure a highly efficient operation. This is accomplished in the present process by utilizing relatively long reaction chambers and removing the heat of reaction by circulating a suitable liquid cooling medium around the reaction chambers. The temperature of the boiling liquid cooling medium, which for the purposes of description is assumed to be water, due to the hydrostatic head gradually increases in the direction of flow of the synthesis gases and the catalyst. The water is introduced into synthesis chamber 1 by means of line 5, passed through zones 10 and around zones 3 and removed as steam by means of line 6.

Although the invention may be applied in any catalytic reaction in which it is desirable to adjust the temperature of the reaction as the catalyst becomes spent, it is particularly applicable in reactions involving the hydrogenation of oxides of carbon for the production of hydrocarbon constituents containing more than two carbon atoms in the molecule. In these reactions, as pointed out heretofore, it is absolutely essential for the success of the operation that not only a predetermined reaction temperature be employed, depending upon the extent to which the catalyst is spent, but it is also essential that the temperature be controlled so that at any point in the reaction zone the temperatures vary preferably less than 5° F. from the predetermined operating temperatures.

Any suitable catalyst known in the art may be used and the operating conditions to some extent will be a function of the particular catalyst or catalyst mixture employed. These catalysts are generally packed within relatively short reaction zones, the diameters of which are generally less than four inches and in many instances less than two inches. In general, according to the present invention, it is preferred, when utilizing reaction zones of this diameter, that the length of the reaction zones be at least 30 feet in length. Particularly desirable results are secured when the length of the reaction zones are in the range above 50 feet to 60 feet.

The cooling medium employed is preferably water, although under certain conditions it may be desirable to employ relatively shorter reaction zones and to utilize cooling liquids which will produce the same temperature differential for the shorter zone. Liquids of this character are liquids which have a relatively high rate of change in vapor pressure with temperature. It is also desirable that the liquid have a high specific gravity. It is evident that when employing liquids of this character it is possible to secure a greater differential in temperature between the top and lower sections of the reaction zone for the same length reaction zone. It is also to be understood that under certain conditions the boiling point of the respective liquid cooling medium employed may be adjusted or controlled by varying the pressure on the cooling medium in question.

The temperatures and pressures of the reaction will vary with various operations, depending upon the character of the feed materials, the particular catalyst employed, and will also be a function of other operating factors. For example, in a process for the production of hydrocarbon constituents containing more than one carbon atom in the molecule by the hydrogenation of oxides of carbon it is preferred to initially contact the fresh synthesis gases with the fresh catalyst at a temperature in a range from about 370° F. to 380° F. When the catalyst is approximately 50% spent with respect to its effective commercial applicability conditions should be adjusted so that the synthesis gases contact the catalyst at a temperature in a range from about 385° F. to 395° F. When the catalyst is spent to the extent that it is no longer commercially suited for promoting the reaction and should be withdrawn from the system, the temperature at which the synthesis gases contact the spent catalyst should be in the range from about 405° F. to 410° F.

In order to further illustrate the invention the following examples are given which should not be construed as limiting the same in any manner whatsoever.

*Example 1*

In a reaction for the production of a maximum yield of hydrocarbon constituents containing more than one carbon atom in the molecule in which reaction zones approximately sixty feet in length are employed, the temperature differentials of the cooling medium when employing water at the respective heights are as follows:

| Distance from top | Total pressure | Temperature |
|---|---|---|
| | Lbs./sq. in. | °F. |
| 0 ft | 210.0 | 385.9 |
| 15 ft | 215.6 | 388.0 |
| 30 ft | 221.3 | 390.4 |
| 60 ft | 232.6 | 394.7 |

*Example 2*

When operating under the above described conditions and employing decane as a cooling liquid, the following results are secured:

| Distance from top | Temperature |
|---|---|
| | °F. |
| 0 ft | 380 |
| 15 ft | 389 |
| 30 ft | 399 |
| 60 ft | 417 |

The process of the present invention is not to be limited by any theory or mode of operation.

I claim:

1. Process for the hydrogenation of carbon oxides comprising passing a gas containing oxides of carbon and hydrogen downwardly through a reaction zone containing fresh catalyst in the upper part thereof, and relatively spent catalyst in the lower part thereof, continuously adding fresh catalyst at said upper part and withdrawing catalyst from said lower part, maintaining temperature and pressure conditions in said reaction zone adapted to produce hydrocarbons containing more than one carbon atom in the molecule, removing the exothermic heat of reaction by a boiling liquid cooling medium maintained in heat exchange relationship with the catalyst, said zone being of such height that the hydrostatic head of said cooling medium is sufficient to produce a pressure equivalent to that of a column of water at least thirty feet high, whereby the boiling temperature of said cooling medium is caused to be appreciably higher at the lower part of said reaction zone than at the top.

2. Process according to claim 1, in which the reaction zone is less than four inches in diameter and at least 30 feet in height.

SUMNER B. SWEETSER.